April 9, 1957     D. W. DREWS     2,788,480
REMOTE CONTROL FOR SHIP PROPULSION
Filed Jan. 18, 1955

United States Patent Office 2,788,480
Patented Apr. 9, 1957

2,788,480
REMOTE CONTROL FOR SHIP PROPULSION

Donald W. Drews, Amherst Township, Erie County, N. Y., assignor to Westinghouse Electric Corporation, East Pittsburgh, Pa., a corporation of Pennsylvania Application January 18, 1955, Serial No. 482,465

4 Claims. (Cl. 318—158)

This invention relates generally to ship propulsion control systems and more particularly to such systems utilizing variable-voltage direct current motor control for determining the speed of rotation of the propellers.

A very desirable feature for a shipboard propulsion control system is that it be able to control the rotational direction and speed of the propellers from any of a number of locations on the ship, such as from the bridge, the flying bridge, or from the crow's nest in the main mast. This is particularly true when the control system is to be used for an ice breaker whereon it is almost mandatory to control the ship movements from a high, remote location, such as the crow's nest, in order most effectively to carry out the ship's mission. The duplication of such controls utilizing systems known heretofore has been very difficult, particularly when it has been necessary to utilize pneumatic as well as electrical control over the main propulsion equipment. When operating in arctic regions, the use of exposed air lines is especially undesirable for crow's nest control inasmuch as freezing or clogging of air lines is almost inevitable.

Additionally, the control system must not accelerate the main propeller drive motors at such a rate as to produce excessive armature currents therethrough since such currents could damage the motors and repair thereof might be extremely difficult, if not impossible, in the regions of which an ice breaker must operate. However, it may become highly desirable to stop the propulsion motors as quickly as possible in order to avoid severe damage. Such requirements may be mutually conflicting but are most desirable for any large vessel.

One object of my invention is to provide a propulsion control system for a seagoing vessel, control over which system may be readily switched to any of a number of locations on the vessel.

Another object is to provide an electrical control system for the main electrical and pneumatic controls of the main propulsion equipment for a vessel, which system obviates the necessity for duplicating main controls when it is desired to control the vessel from any of a number of locations on the ship.

Still another object is to provide a simple, flexible system of control for a seagoing vessel.

Yet another object is to provide a simple, rugged remote control arrangement for a variable-voltage motor control system wherein excitation control for a direct current generator is detemined by the current flow between oppositely rotating taps on parallel connected rheostats, the taps being positioned by the remote control system.

A further object of this invention is to provide a remote control system utilizing a variable voltage motor control wherein the rate of increase of armature voltage applied to the main propulsion motor armature is limited but the rate at which voltage decreases is not limited.

According to one feature of my invention, there is provided a variable voltage motor control system wherein a direct current motor is included which drives a ship propeller. Excitation for the main generator for driving this motor is derived from an exciter separately excited from the voltage between the taps of a pair of parallel connected rheostats. The rheostat taps are driven in opposite directions by a direct current pilot motor, the direction of rotation of the motor being determined by the polarity of the output voltage of a self-saturating magnetic amplifier system which polarity is in turn determined by the direction of current flow through control windings of the system. The control windings are connected between the taps of a second pair of parallel connected rheostats, one of which taps is positioned by the pilot motor to a position predetermined by the position of the other rheostat tap. The voltage between the taps of the second pair of rheostats for given related positions of the taps is zero; at other positions the voltage is of one polarity or of opposite polarity and this polarity determines the direction of rotation of the pilot motor, which motor always tends to drive the tap in a direction that will minimize current through the aforementioned control windings. Thus, the direction of rotation and the speed of the main drive motor may be controlled by the aforementioned one of the second pair of rheostats that is not driven by the pilot motor.

Other objects and features of my invention will become apparent upon a study of the following description thereof when taken in conjunction with the accompanying drawings wherein.

Figure 1:
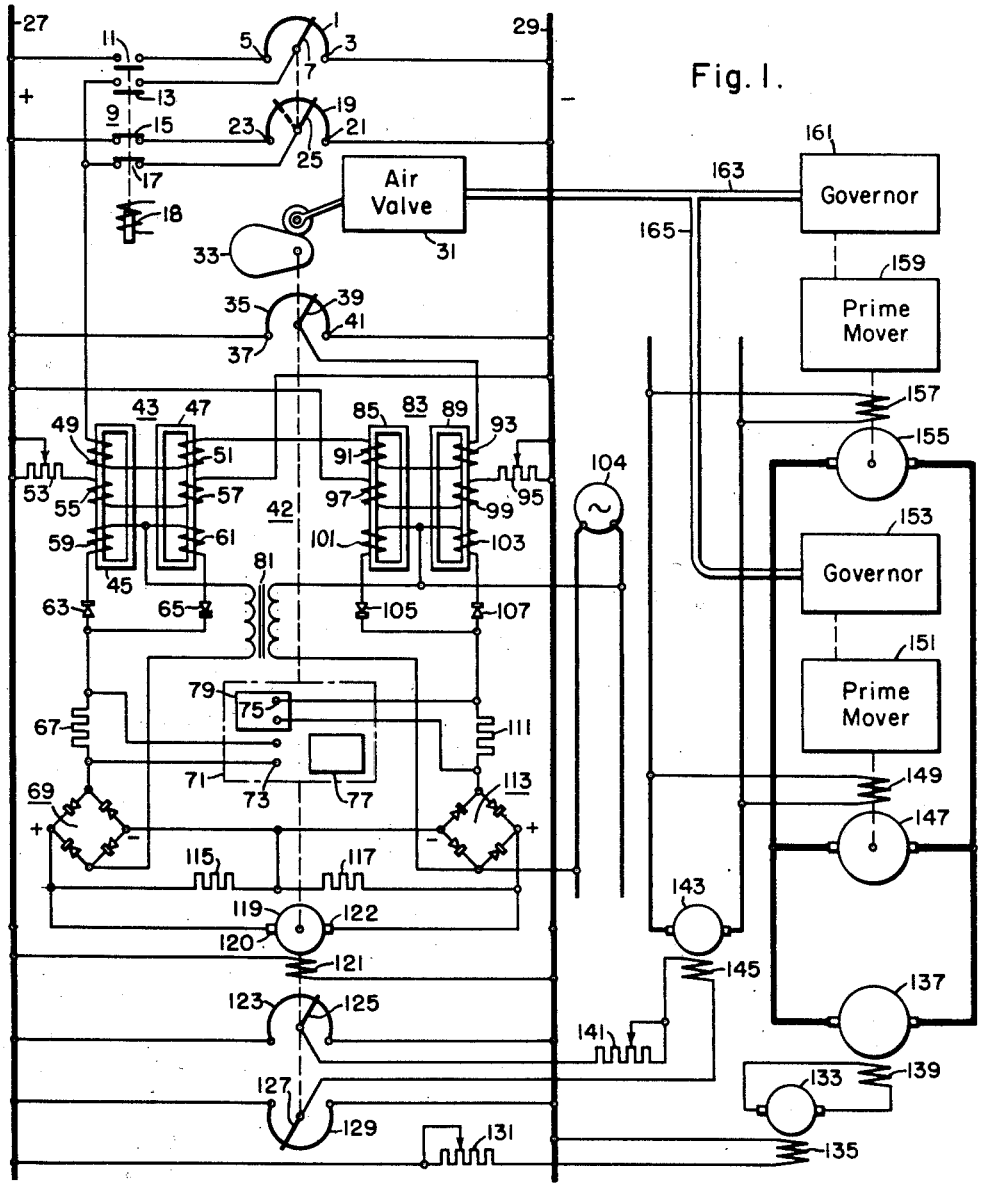
Fig. 1 is a schematic diagram of an embodiment of my invention.

With reference now to Fig. 1 there is shown in schematic diagram form a preferred embodiment of my invention. A separately excited direct current motor 137 is provided for driving the ship propeller (not shown). Armature current for the motor 137 is derived from a plurality of direct current generators, two of which are indicated by reference numerals 147 and 155. These direct current generators are respectively driven by prime movers 151 and 159 which typically are diesel engines, the rotational speeds of which prime movers are determined by governors 153 and 161, respectively. Governors 153 and 161 are preferably of the compressed-air actuated type, and the setting thereof is determined by the adjustment of air valve 31 which is connected to the respective governors through air lines 163 and 165. Suitable valving (not shown) may be included in the air lines for shutting down one or the other of the governors and bringing the prime mover associated therewith to rest.

The separately excited field winding 139 of direct current motor 137 is supplied with current from exciter-generator 133, the output of which is determined by the setting of resistor 131 in series with exciter-generator field winding 135. Exciting current for field winding 135 may be derived from constant potential D. C. buses 27, 29.

The output voltage of direct current generators 147, 155 is determined both by the rotational speed thereof and by the exciting current through field windings 149 and 157, respectively. The magnitude of the field current through these field windings is determined by the output voltage of exciter-generator 143 which has a separately excited field winding 145. Excitation current for field winding 145 is derived from the differential voltage existing between the taps 125 and 127 of parallel connected rheostats 123 and 129. These rheostats are connected between D. C. buses 27 and 29 and the taps 125, 127 thereof are oppositely driven by direct current pilot motor 119 so that a differential voltage exists therebetween except when the taps are centrally positioned on the rheostats. Excitation winding 145 of generator 143 is serially connected with variable resistor 141 between taps 125 and 127. The function of resistor 141 is to recalibrate the output voltage of the exciter-generator 143 in accordance with the number of direct current generators for which it must supply excitation current.

Motor 119 is provided with a separately excited field winding 121 which is connected between buses 27 and 29. Armature current for the motor is derived from the magnetic amplifier system 42 which provides a reversible unidirectional output voltage across the motor armature terminals 120, 122.

Figure 2A:
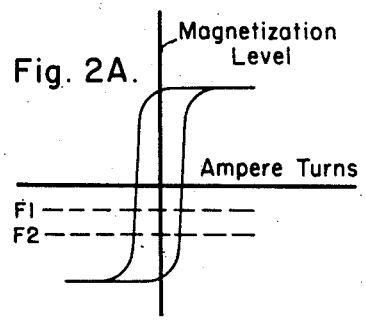
Fig. 2A is a hysteresis loop useful in understanding the operation of the magnetic amplifier shown in Fig. 1.
Figure 2B:
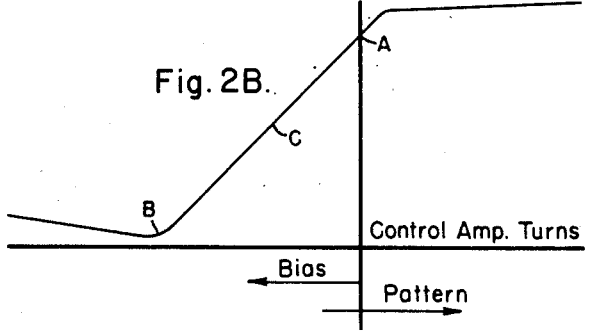
Fig. 2B is a curve of output voltage as a function of control ampere turns of the magnetic amplifier of Fig. 1, which curve is also useful in understanding the operation of the magnetic amplifier.

Magnetic amplifier system 42 comprises two self-saturating magnetic amplifiers of the type generally described above with reference to Figs. 1, 2A and 2B. The output of magnetic amplifier 43 and of magnetic amplifier 83 are combined by mixing resistors 115 and 117 so that magnetic amplifier 43 provides an output voltage the polarity of which is such that armature terminal 120 is positive with respect to armature terminal 122, and magnetic amplifier 83 provides an output voltage of the opposite polarity to the armature terminals.

More specifically, magnetic amplifier 43 includes cores having wound thereon pattern, or control windings 49 and 51, bias windings 55 and 57, and load windings 59 and 61. Self-saturating rectifiers 63 and 65 are inserted in series with load windings 59 and 61, respectively, so as to form a closed series loop. Load current is derived from alternating current generator 104 through isolating transformer 81, the secondary of which is coupled to the load windings through the input terminals of bridge rectifier 69 and a series resistor 67 inserted between rectifiers 63 and 65, and bridge rectifier 69.

Similarly, magnetic amplifier 83 includes magnetic cores 85 and 89 having wound thereon the pattern windings 91 and 93, bias windings 97 and 99, and load windings 101 and 103. In like manner, self-saturating rectifiers 105 and 107 are connected in series with load windings 101 and 103, respectively, so as to form a series loop. Load current is derived directly from alternating current source 104 through bridge rectifier 113 and series resistor 111 which is connected similarly to resistor 67.

Bias windings 55 and 57 are connected between D. C. buses 27 and 29 and are in series with variable resistor 53. Likewise, bias windings 97 and 99 are series connected with variable resistor 95 between buses 27 and 29; pattern windings 49, 51, 91 and 93, connected in series in the order named are connected between taps 25 and 39 of parallel connected rheostats 19 and 35, respectively. Rheostats 19 and 35 are connected between D. C. buses 27 and 29.

The load windings of the magnetic amplifiers, since the magnetic amplifiers are of the self-saturating type, in the absence of any currents in the bias windings and control windings, are effective to drive the cores to saturation. In other words, the magnetic amplifiers will operate at a point such as point A on the curve shown in Fig. 2B. The resistors 53 and 95 are so adjusted that the magnetic amplifiers are biased to cutoff. In other words, in the absence of any currents in the control windings, no output voltage will appear across the output terminals of bridge rectifiers 69 and 113. The magnetic amplifiers thus operate at a point such as point B, on the curve shown in Fig. 2B.

To better understand the functioning of the magnetic amplifier 42, I shall briefly first consider amplifier 43 and then amplifier 83.

The pattern windings 49 and 51 are so wound that when a current flows from left to right, that is when tap 25 is positive with respect to tap 39, the effect of the bias windings 55 and 57 is overcome and an output voltage appears at the output terminals of rectifier 69. That is, magnetic amplifier 43 is caused to operate at some point, as point C, of the curve shown in Fig. 2B. At the same time, the current will flow through control windings 91 and 93 from left to right. These control windings are, however, so wound that their magnetic effect is additive to the magnetic effect of the bias windings 97 and 99. The magnetic amplifier 83 is thus driven even more toward cutoff and no output voltage from this magnetic amplifier appears across the output terminals of rectifier 113.

When the control current is from right to left through the control windings 93, 91, 51 and 49, then magnetic amplifier 83 will operate at some point as C, and magnetic amplifier 43 is driven more to cutoff.

The total effect is that motor 119 is energized by a voltage that is positive at armature terminal 120 and negative at armature terminal 122 when current flows from tap 25 to tap 39.

The rotor, or armature, of motor 119 is coupled to drive cam 33, tap 39 of rheostat 35, tap 125 of rheostat 123, and tap 127 of rheostat 129 and short-circuiting segment carrier 71. The disposition of the cam 33, with respect to the taps and the taps with respect to each other and the cam, is such, that when the taps are all at their mid-positions with respect to their associated rheostats, the cam 33 is positioned for the minimum opening of the valve 31. The flow of fluids to the governors 161 and 153 are then such that the prime movers each operate at some minimum speed.

Further, the gear ratios of the drives are such that for maximum useful throw of the taps a maximum speed change is effected in the prime movers. For the particular showing, this means when the taps are all moved, say through substantially 90° clockwise, the cam is moved substantially 180° clockwise, and when the taps are moved through 90° counterclockwise, the cam 33 is moved substantially through 180° counterclockwise.

A rheostat 19 having the tap 25 is connected across leads 27 and 29 in exactly the same manner as the rheostats 35, 123 and 125, but the tap of rheostat 19 is arranged to be actuated manually.

There is also shown a rheostat 1 which may be switched into the circuit in place of rheostat 19 by means of selector switch 9. The function of rheostats 19 and 1 is to control the current through the pattern windings of the magnetic amplifier and the rheostats may be located at various points around the ship. The taps 7 and 19 are coupled together, preferably by a selsyn or self-synchronous servo system, so as to contact corresponding points on the resistive elements of the rheostats. The rheostat located at the position from which control is to be exercised is thus switched into the circuit by means of selector switch 9 which may be located at a central position readily accessible to the commanding officer of the ship. As shown, contacts 15 and 16 are associated respectively with terminal 23 and tap 25 of rheostat 19 while contacts 11 and 13 are associated with terminal 5 and tap 7 of rheostat 1, one pair of contacts being opened while the other is closed in accordance with the particular rheostat from which control is to be exercised. It will be appreciated that any number of additional rheostats may be similarly connected in the circuit.

In operation, let it be assumed that rheostat 19 is switched into the circuit by selector switch 9 and that the taps 25 and 39 are both midway between the end terminals. This also means that the taps 125 and 127 of the rheostats 123, 129 are in their mid-positions. Cam 33 will thus be in a position such that the prime movers 159 and 151 are operating at minimum speed and no current will flow between taps 125 and 127 of rheostats 123 and 129. Thus, there will be no excitation provided to D. C. generators 143 and 147 and no output voltage will appear thereacross to drive D. C. motor 137. When the tap 25 of potentiometer 19 is moved to the dotted line position, a current will flow from tap 25 through the pattern windings of the magnetic amplifiers to tap 39 so as to produce an output voltage from magnetic amplifier 43. The voltage applied across the control winding from tap 25 to tap 39 is proportional to the difference in the positions of the two taps, but the magnetic amplifiers are designed so that the output voltage and current will be constant with a current through the pattern windings produced by only a few degrees difference in the positions of the taps. Motor 119 will drive tap 39 in a counterclockwise direction at a constant speed to minimize the current from tap 25 to tap 39. Contact bar 79 will move to the left and engage contact terminal 75, thereby short-circuiting resistor 111. Resistor 67 will remain in the circuit to reduce the output voltage applied to the motor. The rheostat taps 125 and 127 will both move counterclockwise from their mid-position, and a potential will appear therebetween. Tap 125 will become more positive and tap 127 more negative and that will excite the field 145 of exciter-generator 143, and in consequence an excitation will be applied to the field windings 157 and 149 of D. C. generators 155 and 147. The output voltage of the generators will build up so as to provide armature current to motor 137 and thereby increase the speed thereof. The resistor 67 will be effective to limit the rotational speed of motor 119 and thus the rate at which the excitation is applied to the generators 147 and 155 and the speed rise of the motor 137 is controlled. Due to the saturation of magnetic amplifier 43, the speed of motor 119 will be essentially constant until tap 39 approaches a position corresponding to the dotted line position of tap 25, after which the voltage output of magamp 43 will rapidly drop to zero and motor 119 will stop.

Assume now that the tap 25 is moved suddenly to the right of the position reached in the example above. An output voltage will be produced by magnetic amplifier 83. Until the central position is reached by tap 39, resistor 111 will be short-circuited by segment 79 so that the full reverse output voltage from magnetic amplifier 83 will be applied across the armature terminals 122, 120 of motor 119 and rheostat taps 39, 125 and 127, and cam 33 will be driven at the maximum speed of which motor 119 is capable in such a direction that tap 39 will follow tap 25. As soon as the central position of tap 39 corresponding to minimum output voltage from generators 155 and 147 is reached, the short circuit imposed on resistor 111 by contact segment 79 will be removed and the rotational speed of motor 119 will be reduced. The rate at which the reverse excitation to the generators 149 and 155 is thereafter increased and the rate of buildup of the output voltage of the generators will be accordingly reduced so as not to produce dangerously high armature currents through motor 137.

Similarly, suddenly moving the tap 25 from right to left will produce an output voltage from amplifier 43. Until the central position is reached by tap 39, resistor 67 will be short circuited by segment 77 so that full output voltage from magnetic amplifier 43 will be applied across armature terminals 120, 122. As soon as the central position of tap 39 is reached, the short circuit imposed on resistor 67 by contact segment 77 will be removed to again reduce the rotational speed of motor 119.

The control system described above may be located in a central position protected from weather and freezing temperatures with the optional exception of control rheostats 1 and 19. The pneumatic lines which are desirable for controlling the speed of the prime movers are thus protected and have been found to present no difficulties due to freezing of moisture within the lines. The inclusion of resistors 67 and 111 in the manner described prevents imposition of armature currents on the main drive motor of such magnitude as to damage the armature windings thereof and yet allows decrease of motor speed at a maximum rate.

The invention is not to be restricted to the specific structural details, arrangement of parts or circuit connections herein set forth, as various modifications thereof may be effected without departing from the spirit and scope of this invention.

I claim as my invention:

1. In a control system including a direct current motor, a direct current generator for supplying armature current therefor, an exciter generator for supplying excitation current to a separately excited field winding of said direct current generator; excitation supply system for a separately excited winding of said exciter generator including: first and second rheostats adapted to be energized from a direct current source, said separately excited winding being connected to variable taps on said first and second rheostats so that exciting current flow is determined by the potential difference therebetween; second direct current motor for differentially driving said variable taps to vary the voltage between said taps; third and fourth parallel connected rheostat means, each having a variable tap thereon, said third rheostat means being positioned by said second direct current motor so that the position thereof relative to a given position thereof is indicative of the magnitude and relative polarity of the voltage between the taps of said first and second rheostats; first self-saturating magnetic amplifier means including a control winding and a direct current output circuit, the magnitude and polarity of the output voltage thereof being respectively determined by the magnitude and sense of the current flow through said control winding; said control winding being connected to said taps on said third and fourth rheostat means so that the current flow therethrough is determined by the potential difference between said variable taps; said second motor means driving said tap on said third rheostat so as to decrease the magnitude of the current flow through said control winding; said magnetic amplifier including means for reducing said output voltage therefrom when said motor is driving said third rheostat away from a given position corresponding to zero voltage difference between said first and second rheostat taps and for applying full magnetic amplifier output voltage to said motor means when said motor is driving said tap of said third rheostat toward said given position.

2. In a control system including a direct current motor, a direct current generator for supplying armature current therefor, an exciter generator for supplying excitation current to a separately excited field winding of said direct current generator; excitation supply system for a separately excited winding of said exciter generator including: first and second rheostats adapted to be energized from a direct current source, said separately excited winding being connected to variable taps on said first and second rheostats so that exciting current flow is determined by the potential difference therebetween; second direct current motor means for differentially driving said variable taps to vary the voltage between said taps; third and fourth parallel connected rheostat means, each having a variable tap thereon, the said third rheostat means being positioned by said second direct current motor so that the position thereof relative to a given position thereof is indicative of the magnitude and relative polarity of the voltage between the taps of said first and second rheostats; first and second self-saturating magnetic amplifier means each including control winding means and a direct-current output circuit, said control winding means being connected to said taps of said third and fourth rheostat means so that the magnitude and direction of current therethrough is determined by the magnitude and sense of potential difference between said taps; means coupling said output circuits of said magnetic amplifiers to the armature of said second direct current motor so that said first magnetic amplifier provides a voltage of one polarity across said armature and said second magnetic amplifier provides a voltage of the opposite polarity thereacross, resistor means connected in the output circuit of each of said magnetic amplifiers adapted to reduce the output voltage thereof to slow the speed of rotation of said second motor, and means driven by said second motor adapted to short circuit said resistors during periods when said tap of said third rheostat is being driven toward a position corresponding to zero voltage difference between the taps of said first and second rheostats.

3. In a control system including a direct current motor, a direct current generator for supplying armature current therefor, an exciter generator for supplying excitation current to a separately excited field winding of said direct current generator; excitation supply system for a separately excited winding of said exciter generator including: first and second rheostats adapted to be energized from a direct current source, said separately excited winding being connected to variable taps on said first and second rheostats so that exciting current flow is determined by the potential difference therebetween; second direct current motor means for differentially driving said variable taps to vary the voltage between said taps; third and fourth parallel connected rheostat means, each having a variable tap thereon, the said third rheostat means being positioned by said second direct current motor so that the position thereof relative to a given position thereof is indicative of the magnitude and relative polarity of the voltage between the taps of said first and second rheostats; first self-saturating magnetic amplifier means including a control winding and a direct current output circuit, the magnitude and polarity of the output voltage thereof being respectively determined by the magnitude and sense of the current flow through said control winding; said control winding being connected to said taps on said third and fourth rheostat means so that the current flow therethrough is determined by the potential difference between said variable taps; said second motor means driving said tap on said third rheostat so as to decrease the magnitude of the current flow through said control winding; said magnetic amplifier including control means for reducing said output voltage therefrom when said motor is driving said third rheostat away from a given position corresponding to zero voltage difference between said first and second rheostat taps and for applying full magnetic amplifier output voltage to said motor means when said motor is driving said tap of said third rheostat toward said given position; said control means including resistor means connected in the output circuit of each of said magnetic amplifiers adapted to reduce the output voltage thereof to slow the speed of rotation of said second motor, and means driven by said second motor adapted to short circuit said resistors during periods when said tap of said third rheostat is being driven toward a position corresponding to zero voltage difference between the taps of said first and second rheostats.

4. In a control system including a direct current motor, a direct current generator for supplying armature current therefor, and an exciter generator for supplying excitation current to a separately excited field winding of said direct current generator; excitation supply system for a separately excited winding of said exciter generator including: first and second rheostats adapted to be energized from a direct current source, said separately excited winding being connected to variable taps on said first and second rheostats so that exciting current flow is determined by the potential difference therebetween; second direct current motor means for differentially driving said variable taps to vary the voltage between said taps; third and fourth parallel connected rheostat means, each having a variable tap thereon, the said third rheostat means being positioned by said second direct current motor so that the position thereof relative to a given position thereof is indicative of the magnitude and relative polarity of the voltage between the taps of said first and second rheostats; first and second self-saturating type magnetic amplifier means each including control winding means and a direct-current output circuit, said control winding means being connected to said taps of said third and fourth rheostat means so that the magnitude and direction of current therethrough is determined by the magnitude and sense of potential difference between said taps; coupling means coupling said output circuits of said magnetic amplifiers to the armature of said second direct current motor so that said first magnetic amplifier provides a voltage of one polarity across said armature and said second magnetic amplifier provides a voltage of the opposite polarity thereacross; said coupling means including first and second resistor means respectively connected in the output circuits of said first and second magnetic amplifiers adapted to reduce the output voltage thereof to slow the rotational speed of said second motor; contact carrier means driven by said second motor; first and second contact means on said carrier means for short circuiting one or the other of said resistors to apply reduced magnetic amplifier output voltage to said second motor when said tap of said third rheostat is being driven away from a position corresponding to zero voltage differences between said taps of said first and second rheostats.

References Cited in the file of this patent
UNITED STATES PATENTS

| | | |
|---|---|---|
| 2,518,865 | Cartotto | Aug. 15, 1950 |
| 2,714,695 | Schaelchlin | Aug. 2, 1955 |